United States Patent [19]

Derflinger et al.

[11] Patent Number: 5,701,574

[45] Date of Patent: Dec. 23, 1997

[54] METHOD OF PRODUCING A SLIDING SLEEVE FOR THE SYNCHRONIZER MEANS OF A CHANGE-SPEED GEAR

[75] Inventors: Karl Derflinger, Laakirchen; Herbert Schmid, Vorchdorf; Johann Dickinger, Bad Wimsbach/N., all of Austria

[73] Assignee: Miba Sintermetall Aktiengesellschaft, Laakirchen, Austria

[21] Appl. No.: 597,293

[22] Filed: Feb. 6, 1996

[30] Foreign Application Priority Data

Feb. 16, 1995 [AT] Austria ................ 282/95

[51] Int. Cl.$^6$ ................ B22F 3/16; B22F 3/17; B22F 5/08
[52] U.S. Cl. ................ 419/26; 419/28; 419/38
[58] Field of Search ................ 419/28, 26, 38

[56] References Cited

U.S. PATENT DOCUMENTS

| | | | |
|---|---|---|---|
| 3,794,095 | 2/1974 | Insam | 152/239 |
| 4,111,031 | 9/1978 | Vennemeyer et al. | 72/359 |
| 4,165,243 | 8/1979 | Sarnes | 148/16.5 |
| 4,618,049 | 10/1986 | Pflaüm et al. | 192/107 M |
| 4,666,665 | 5/1987 | Hornsby et al. | 419/48 |
| 4,770,283 | 9/1988 | Pütz et al. | 192/107 M |
| 4,811,825 | 3/1989 | Christian et al. | 192/53 F |
| 4,940,565 | 7/1990 | Müller | 419/8 |
| 5,096,037 | 3/1992 | Knoess et al. | 192/114 T |
| 5,143,192 | 9/1992 | Vojacek et al. | 192/107 M |
| 5,343,993 | 9/1994 | Soffa | 192/53 F |

FOREIGN PATENT DOCUMENTS 0389024  9/1990  European Pat. Off. .

*Primary Examiner*—Kathryn L. Gorgos
*Assistant Examiner*—Chrisman D. Carroll
*Attorney, Agent, or Firm*—Collard & Roe, P.C.

[57] ABSTRACT

A method of producing a sliding sleeve for a synchronizer of a speed-changing gear, the sliding sleeve being comprised of a sintered powder metal compact having a claw extending along an inner periphery of the sleeve, and the claw consisting of teeth having opposite end faces and a cross-section between the end faces which is reduced relative to an undercut portion at at least one of the end faces, which method comprises the steps of sintering the powder metal compact having the claw consisting of the teeth having the opposite end faces and the reduced cross-section extending between the end faces, and then applying solely an axial upsetting force to the one end face to form the undercut portion thereat while leaving the reduced cross-section unchanged.

2 Claims, 2 Drawing Sheets

METHOD OF PRODUCING A SLIDING SLEEVE FOR THE SYNCHRONIZER MEANS OF A CHANGE-SPEED GEAR

BACKGROUND OF THE INVENTION

1. Field of the Invention

This invention relates to a method of producing a sliding sleeve for a synchronizer of a speed-changing gear, the sliding sleeve being comprised of a sintered powder metal compact having a claw extending along an inner periphery of the sleeve, and the claw consisting of teeth having opposite end faces and a cross-section between the end faces which is reduced relative to an undercut portion at at least one of the end faces.

2. Description of the Prior Art

In speed-changing gears having a hub fixedly mounted on a shaft and a gearwheel freely rotatably mounted on the shaft, a trouble-free connection of the hub with the gearwheel is possible by means of a dog clutch consisting of a sliding sleeve that is axially adjustable on the hub and can be engaged therewith, if the gearwheel rotates at the rotational speed of the hub. This is achieved by a cone clutch provided between the hub and the gearwheel, which comprises a biconical ring entraining the gearwheel with its rotation, which biconical ring can be clamped in frictional engagement between an inner friction ring fixedly connected with the hub and a synchronizing ring axially adjustable with respect to the friction ring by the sliding sleeve. If the sliding sleeve is moved on the hub so as to effect an engagement of the clutch, the axial engagement of the synchronizing ring provides for an acceleration by frictional engagement of the biconical ring between the inner friction ring and the outer synchronizing ring, and thus of the gearwheel fixedly connected with the synchronizing ring to the rotational speed of the hub, which provides for the subsequent unimpeded engagement of the clutch between the sliding sleeve and the claw ring of the gear wheel. In order to achieve a sort of locking for the engagement of the clutch, which prevents an unintended disengagement of the clutch in particular in the case of load changes, the teeth of the claw toothing of the sliding sleeve are provided with undercut portions at their end faces, which undercut portions cooperate with the teeth of claw ring on the side of the gearwheel so as to effect an axial locking. Since the tooth cross-section between the undercut portions is reduced as compared to the cross-section of the ends, expensive machining processes have to be used for the production of such sliding sleeves.

To provide for a powder-metallurgical manufacture despite the undercut portions, it has been suggested (U.S. Pat. No. 5,096,037) to provide a sliding sleeve consisting of two sintered partial rings joined by means of conventional joining processes. Due to the symmetrical position of the partial sliding sleeve rings with respect to a plane of symmetry extending normal to the sliding sleeve axis, the compacts of the partial rings made from a sintering powder can easily be removed from the pressing tool in axial direction since the undercut portion is only provided on one side. This cannot be done in the case of undercut portions on both sides because of the reduced cross-section between the undercut portions. Apart from the increased production costs due to the manufacture of partial rings, this possibility for a powder-metallurgical production inevitably has the disadvantages involved in the subsequent joining of the sintered partial rings.

SUMMARY OF THE INVENTION

It is, therefore, the object of the invention to provide a sintering method for the production of a sliding sleeve of the above-mentioned type, which provides for the manufacture of the sliding sleeve in one piece and, therefore, eliminates the disadvantages involved in the joining of two sintered parts.

This object is solved by the invention by sintering the powder metal compact having the claw consisting of the teeth having the opposite end faces and the reduced cross-section extending between the end faces, and then applying solely an axial upsetting force to the one end face to form the undercut portion thereat while leaving the reduced cross-section unchanged.

Since the sintered compact has no undercut portions at least at one end face, the disadvantages connected with the removal of the compact from the pressing tool are eliminated, so that the sliding sleeve can be sintered in a well-known manner without undercut portions at least at one end face of the teeth. The missing undercut portions for the desired locking are subsequently formed by applying an axial upsetting force to the one end face to form the undercut portion thereat, which can be done without any major effort, all the more so as the undercut portions are comparatively small and, therefore, only require a correspondingly small accumulation of material. Due to the simple subsequent formation of the undercut portions by upsetting, the formation of undercut portions of the teeth by means of the force-applying tool can be omitted, and the teeth can be pressed with a cross-section continuously reduced over their entire length. Therefore, the pressing tool can have a much simpler design.

Since due to an improved clutch engagement of the claw toothing of the sliding sleeve with the claw ring of the gearwheel to be driven, the teeth of the claw toothing of the sliding sleeve frequently have wedge-shaped end faces, it is sufficient to reduce the wedge angle of the end faces when forming the undercut portions, which results in an advantageous flow of material.

BRIEF DESCRIPTION OF THE DRAWING

The method in accordance with the invention will now be described in detail with reference to the drawing, wherein.

DETAILED DESCRIPTION OF A PREFERRED EMBODIMENT

Figure 1:
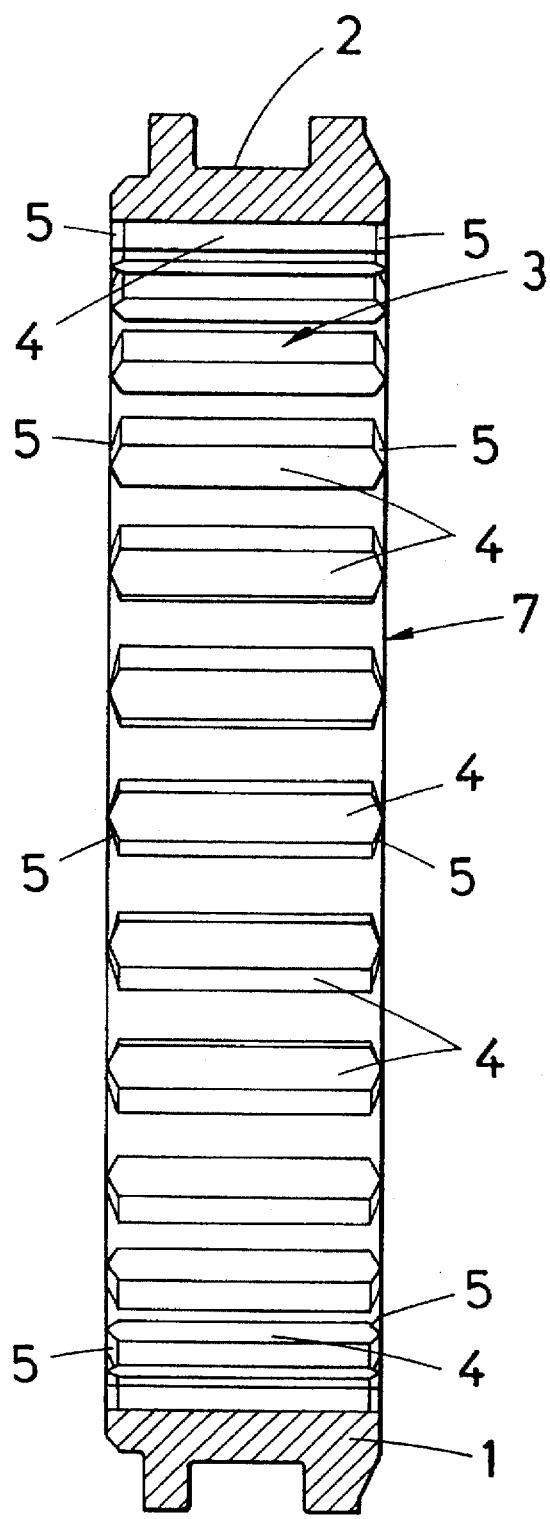
FIG. 1 shows an axial section of the sintered compact of a sliding sleeve before the formation of the undercut portions of the teeth by means of upsetting.
Figure 2:
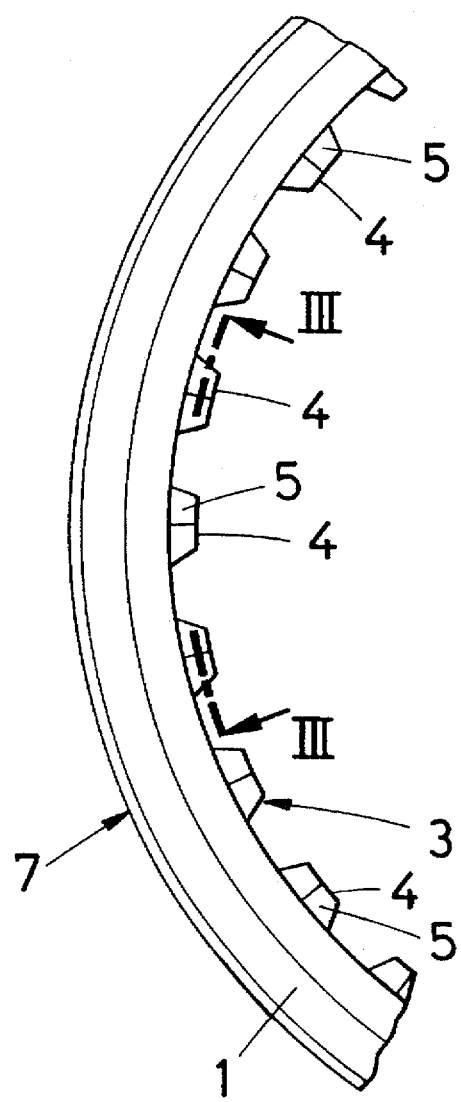
FIG. 2 shows the sliding sleeve in a fragmentary end view.
Figure 3:
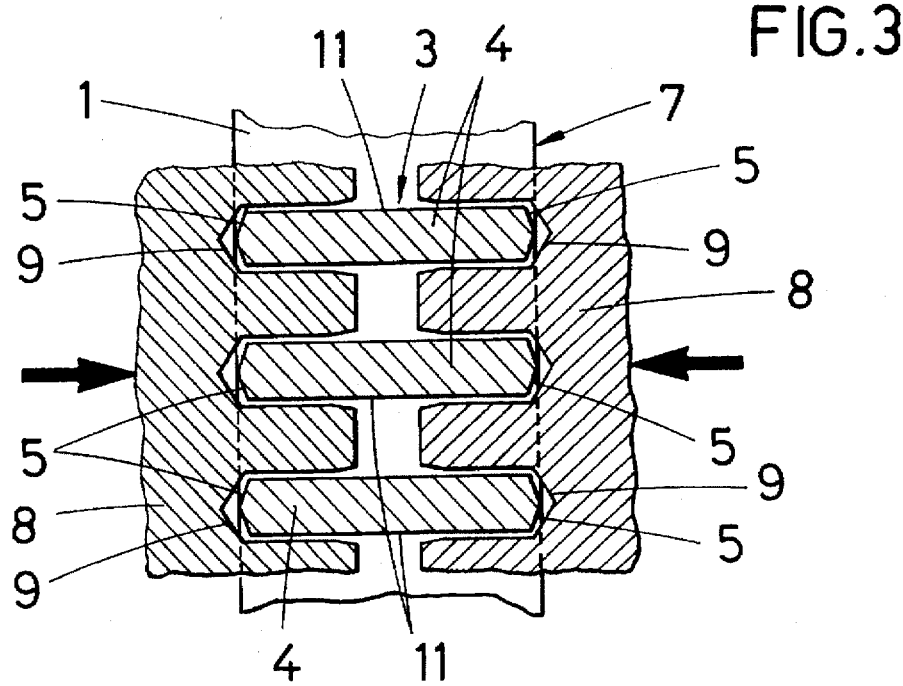
FIG. 3 shows a section along line III—III of FIG. 2, and an upsetting tool applied to the teeth.
Figure 4:
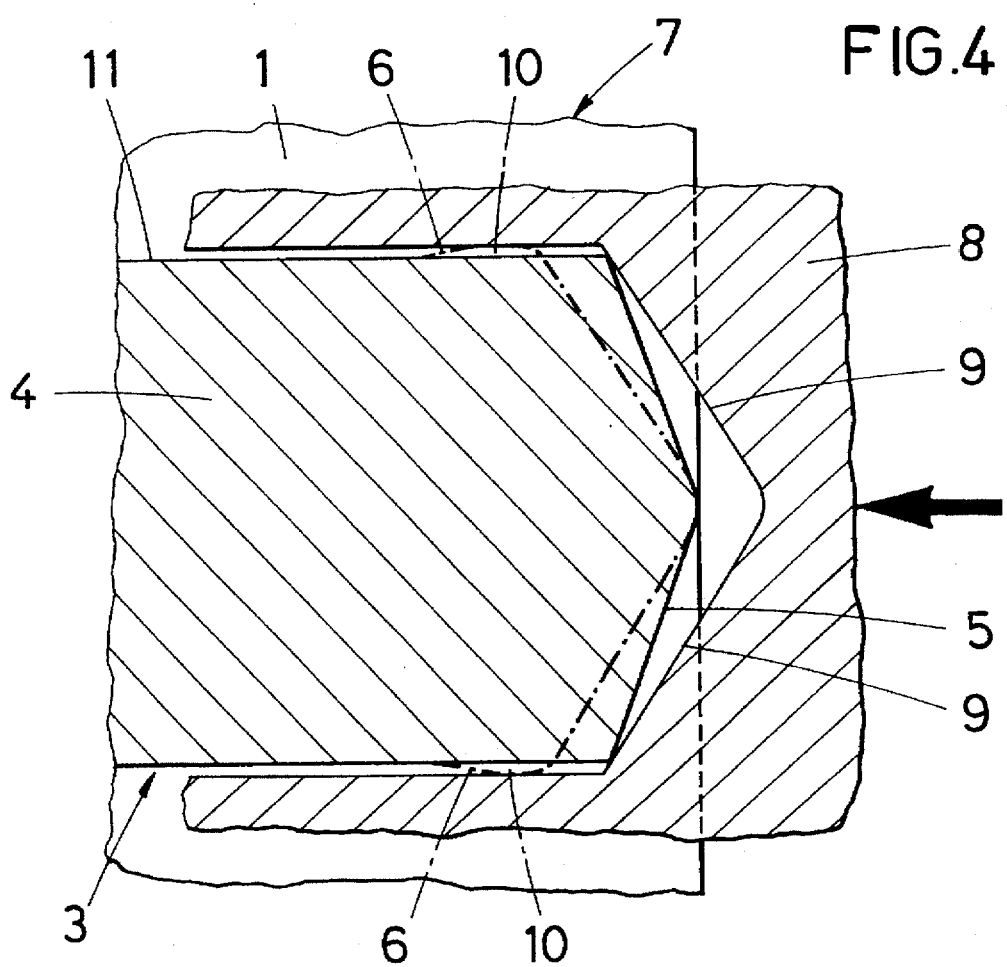
FIG. 4 shows an enlarged fragmentary view illustrating the application of an upsetting force to an end of a tooth.

The illustrated sliding sleeve for a synchronizer of a speed-changing gear of a motor vehicle substantially consists of a ring body 1, which on its outer periphery has a receiving groove 2 for the engagement of a shifter fork and on its inner periphery has a claw toothing 3, which, depending on the axial sliding direction of the sliding sleeve, forms a claw clutch with the claw ring of one of two gearwheels arranged at respective sides of the sliding sleeve and coaxial therewith. The teeth 4 of the claw toothing are provided with wedge-shaped end faces 5, at least some of the teeth having undercut portions 6 (FIG. 4) adjoining end faces 5 to achieve an axial locking with the claw ring of the engaged gearwheel. This locking prevents an unintended disengagement of the claw clutch. However, teeth provided with undercut portions at both end faces make a powder-metallurgical production of the sliding sleeve impossible because a compact made from a sintering powder cannot be removed from the pressing tool. Therefore, a compact 7 is made and sintered which has teeth 4 without undercut portions 6, i.e. teeth 4 whose cross-section over the length of the tooth allows a simple removal of the compact from the pressing tool. After having been removed from the pressing tool, compact 7 is sintered and calibrated in a conventional manner, before the undercut portions 6 are formed by upsetting, as indicated in FIGS. 3 and 4. For this purpose, an upsetting tool 8 is used which applies an axial upsetting force to the wedge-shaped end faces 5 of the teeth 4. Wedge faces 9 of upsetting tool 8 enclose a smaller angle than the wedge angle of end faces 5 of the teeth 4. A suitable upsetting force, therefore, produces a material accumulation 10 constituting the undercut portions 6, as shown in FIG. 4 by the dash-dotted line. The upsetting tool 8 not only effects a flow of material, but also a compaction of material in the area of the end faces 5, which leads to an advantageous adaptation of the properties of the material to the future loads acting thereon.

After the formation of the undercut portions 6 by means of upsetting, the teeth 4 can be finished between the undercut portions in the area between reduced cross-section 11 and the material accumulation 10 by means of a chasing tool which is rolled over the claw toothing 3. The sliding sleeve thus produced can, of course, be subjected to a usual heat treatment or the like.

We claim:

1. A method of producing a sliding sleeve for a synchronizer of a speed-changing gear, the sliding sleeve being comprised of a sintered powder metal compact having a claw extending along an inner periphery of the sleeve, and the claw consisting of teeth having opposite end faces and a cross-section between the end faces which is reduced relative to an undercut portion at at least one of the end faces, which method comprises the steps of (a) sintering the powder metal compact having the claw consisting of the teeth having the opposite end faces and the reduced cross-section extending between the end faces, and (b) then applying solely an axial upsetting force to the one end face to form the undercut portion thereat while leaving the reduced cross-section unchanged.

2. The method of claim 1, wherein the end faces of the teeth are wedge-shaped, and the upsetting force is applied to the one end face to reduce the wedge angle.

* * * * *